INVENTOR.
LAVERNE H. WILLISFORD

April 14, 1970    L. H. WILLISFORD    3,505,758
ANTIFOULING COVERING FOR SUBMERGED MARINE OBJECTS
Filed Nov. 15, 1967    2 Sheets-Sheet 2

INVENTOR.
LAVERNE H. WILLISFORD
BY
*Milliken*
ATTORNEY

United States Patent Office 3,505,758
Patented Apr. 14, 1970

3,505,758
ANTIFOULING COVERING FOR SUBMERGED MARINE OBJECTS
Laverne H. Willisford, Cuyahoga Falls, Ohio, assignor to The Goodyear Tire & Rubber Company, Akron, Ohio, a corporation of Ohio
Filed Nov. 15, 1967, Ser. No. 683,229
Int. Cl. A01m 25/00
U.S. Cl. 43—131      8 Claims

ABSTRACT OF THE DISCLOSURE

An antifouling protective covering for preventing growth of barnacles and other marine organisms on the exterior of marine objects, such as sonar domes and the like, submerged in sea water. The covering consists of a double-wall, rubber-coated fabric reservoir which carries an intermediate layer of diffusible toxic or repellent material. The toxic material diffuses through the outer wall and provides a continuous supply of toxic material to the exposed outer surface to replace any toxic material lost to sea water.

---

This invention relates to a protective covering for preventing the growth of barnacles and other marine organisms on submerged marine objects.

BACKGROUND OF THE INVENTION

In the past, numerous coatings have been devised for undersea installations in an attempt to prevent the growth of marine organisms such as barnacles, algae, bacteria, and various other organisms on the surface of such underwater installations. Such coatings have usually been in the form of paint applied to the surface of the object to be protected and contained such toxic agents as various oxides or salts of copper, mercury, zinc, lead, and arsenic. The antifouling paints used today have a number of defects. One of the primary defects is the short foul-free life. Secondly, such paints lack durability and have low abrasion resistance. Many paints have unfavorable chemical compatability with the surfaces on which they are used and tend to magnify electrolytic corrosion when used over metallic surfaces. Paints which have such characteristic require an additional anticorrosive undercoating.

The short antifouling life of such paints is due to the small amount of toxic material present in the paint. It is a problem to provide a sufficient amount of toxic material in the coating to last for any great length of time. This is particularly true since it is very difficult to build up an antifouling paint layer much beyond 10 mils in thickness; therefore, the total amount of paint available to serve as a reservoir or matrix for containing toxic material is very small and results in the toxic material being lost from the surface in a relatively short time. The solution to the problem would, of course, be to devise a matrix or reservoir which would provide a continuous supply of toxic material to replace that which is lost from the outer surface.

OBJECTS OF THE INVENTION

It is the primary object of this invention to overcome the difficulties encountered by prior art antifouling coverings by providing a reservoir or matrix which will contain a much larger amount of toxic or repellent material than can be contained in an ordinary layer of antifouling paint.

It is a further object of this invention to provide an antifouling covering which is usable on a great variety of submerged marine structures.

Still another object of the invention is to provide an antifouling covering which is particularly adaptable for use with flexible fabric structures used in underwater installations.

These and other objects of the invention will become more apparent in the following specification and the accompanying drawings.

DESCRIPTION OF THE PREFERRED EMBODIMENTS

Figure 1:
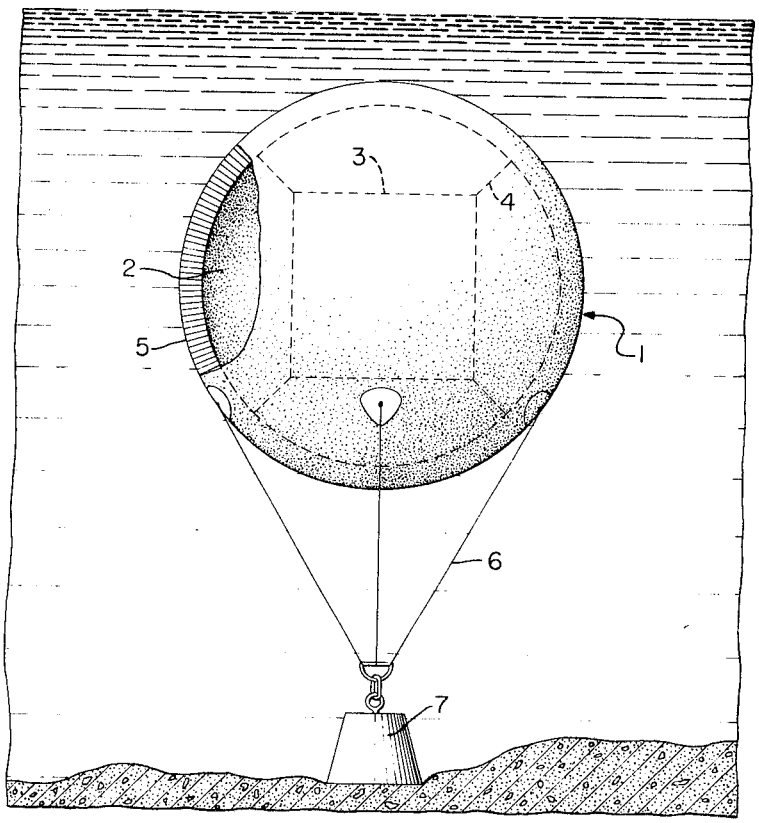
FIG. 1 is a side view of a submerged structure with a portion broken away to show the protective antifouling covering of the invention.

FIG. 1 shows a submerged sonar dome, indicated generally by the numeral 1, as a typical example of submerged undersea installations on which the covering of the present invention may be used. The dome 1 is illustrated as a spherical, flexible fabric structure having a spherical fabric wall 2 inside of which is suspended an assembly of sonar equipment 3 supported inside the wall 2 by a plurality of connectors 4. The exterior of the wall 2 is covered by an antifouling covering assembly indicated generally by the numeral 5. The spherical portion of the sonar dome 1 is held in a submerged position by a plurality of guy lines 6 attached to the dome 1 and fastened to a suitable anchor weight 7.

It should be understood that the dome 1 is merely illustrative of one type of structure on which the covering of this invention may be used. It may also be used on underwater fuel tanks, submarine vehicles, pilings, and many other types and shapes of structures. The present invention is especially well suited for use with flexible fabric structures, however.

Figure 2:
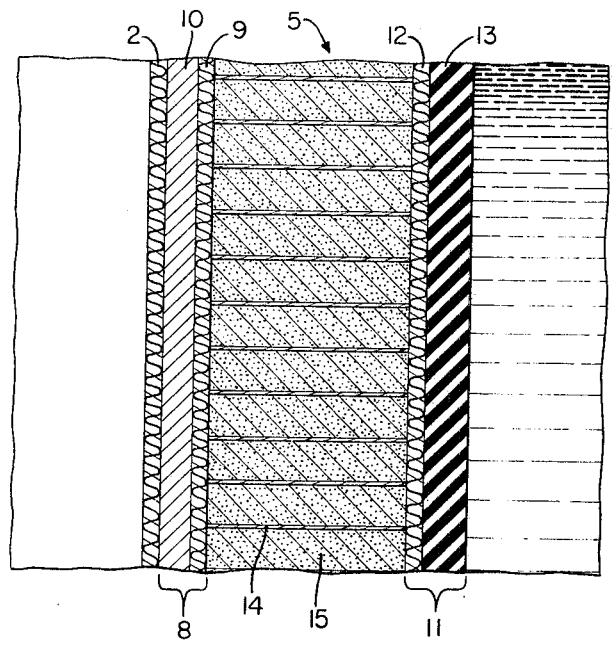
FIG. 2 is a fragmentary cross-sectional view through the wall of a structure utilizing the covering of the invention.

Referring now to FIG. 2, the covering 5 is shown in greater detail attached to the outside of the fabric wall 2 of the sonar dome 1. It may be attached by an adhesive or other suitable means. The covering 5 has an inner wall 8 which in turn consists of a flexible layer of fabric 9 coated with a nonpermeable barrier layer 10 which may be made of polyvinylchloride, polyvinylidene fluoride, polytetrafluoroethylene or various epoxy resins, which lies between the fabric layer 9 and the fabric wall 2. The covering 5 also has an outer wall 11 which consists of a flexible fabric layer 12 having an outside rubber layer 13 attached thereto. A plurality of flexible cord-like members or drop threads 14 interconnect the opposed sides of the fabric layer 9 and the fabric layer 12. These drop threads 14 hold the inner wall 8 and the outer wall 11 in spaced relationship to each other when the space between walls 8 and 11 is filled with a toxic layer 15 which will be described later more specifically.

The manner of constructing the combination of fabric layers 9 and 12, connected by drop threads 14, may be seen by referring to Patent No. 2,743,510, issued to P. Mauney, et al., which shows the manner in which a plurality of drop threads are interwoven with each of the two sheets of fabric to form the walls of a hollow, inflatable fabric panel. Panels of this type are manufactured by The Goodyear Tire & Rubber Company under the trademark "Airmat." Although other means may be used for constructing the double-wall covering of this invention, the structure shown in the above-referenced patent provides a very strong and effective structure.

The barrier layer 10 is adhered to the fabric layer 9 and may be a coating which actually penetrates the fabric and is cured therewith to form an integral wall structure. Similarly, rubber layer 13 may be embedded in the fabric layer 12 and cured therewith to form an integral stucture. In some instances, it may be desirable to eliminate the barrier 10 or replace it with a permeable layer similar to the layer 13. For example, it may be desirable to place antirust and antirot preservatives in the intermediate layer 15 and permit them to diffuse through the inner wall 8 onto the object to be protected.

The intermediate toxic layer 15 is made of bis(tri-n butyl tin oxide) which is placed within the covering in a paste-like form. A paste-like substance may be made by mixing liquid bis (tri-n butyl tin oxide) with an inert powder such as clay or calcium silicate. Either the vehicle or the solid must be toxic. Both may be toxic. If only the solid is toxic, the vehicle must dissolve enough of it to be effective. The vehicle may consist of more than one chemical substance, as may the solid; this provides for synergistic effects broadening the effectiveness against more organisms, as well as multipurpose combinations (killers, repellants). The outside rubber layer 13 is of such a chemical compound that it is permeable with respect to the toxic layer 15. The toxic layer 15 may either kill or repel marine organisms which normally attach themselves to undersea installations. Various well-known preservative substances may also be included in the layer 15 to prevent deterioration of the walls of the covering and of the object being protected.

Figure 3:
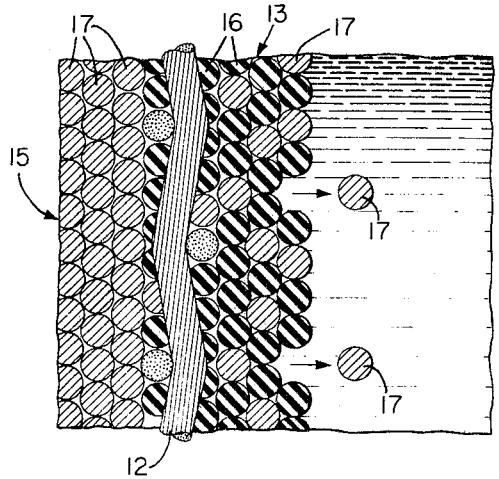
FIG. 3 is a greatly enlarged view of the outer wall of the covering shown in FIG. 2, illustrating the manner in which toxic material diffuses through the outer wall.

As may be seen in FIG. 3, the rubber layer 13 is made up of a plurality of individual rubber molecules 16 which serve as a matrix for a plurality of molecules 17 of the toxic layer 15. As may be seen, some of the molecules 17 near the outer exposed surface of the rubber layer 13 are lost to the sea water 18. As the molecules 17 are gradually lost, they are replaced by other molecules which diffuse from the toxic layer 15 through the fabric layer 12 and then to the outer surface of the rubber layer 13. The length of time which the protective antifouling covering 5 will continue to serve its purpose depends upon the amount of toxic material stored in the layer 15 and the rate at which the molecules 17 diffuse from toxic layer 15 through the fabric 12 to the outer surface of the rubber layer 13. The rate of diffusion can be controlled by the degree of coarseness of the fabric layer 12 and by the molecular structure of the rubber layer 13. The diffusion rate of the toxic material through the layer 13 can also be affected by compounding techniques with the use of additives which increase or decrease the diffusion rate. The condition under which the layer 13 is cured will control the cross-linking of the molecules and will also affect the diffusion rate.

The rubber layer 13 may be made of natural rubber or synthetic rubbers or various polymeric materials, the choice of which depends primarily upon the toxic agent being used in the layer 15. Although bis(tri-n butyl tin oxide) is shown as an example used with the layer 13 being made of neoprene, other toxic agents may also be used, such as bis(n-tributyl tin sulfide), phenyl mercury oleate, copper pentachlorophenate, tributyl tin acetate, tributyl tin fluoride and triphenyl tin chloride. The type of elastomeric material used for the layer 13 must be determined by the toxic agent used. Some toxic agents, because of their molecular structure, will work more satisfactorily with certain types of elastomers than with others.

Figure 4:
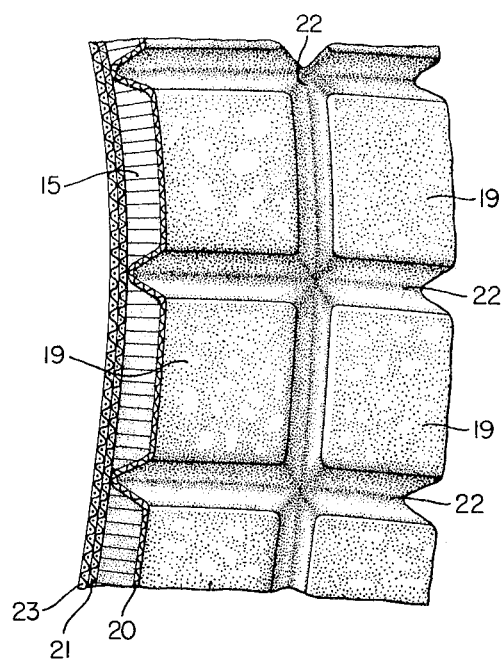
FIG. 4 is a fragmentary view showing another embodiment of the invention.

FIG. 4 shows a modification of the invention in which the outside surface of the object to be protected is not covered by an unbroken double-wall cover as shown in FIG. 1 but is covered by many individual double wall pouches 19 formed by fastening together the outer wall 20 and the inner wall 21 at seams 22. The double wall structure is attached to the outside of the wall 23 of the object to be protected. An inlet conduit (not shown) may be provided in each of the pouches 19 for filling them with the toxic layer 15. It will be understood that the supply of material in the intermediate layer can be replenished periodically from time to time as needed through such inlet conduit. An outlet conduit (not shown) may also be provided to permit flushing out or removal of the material in the intermediate layer and replacing it with a different type of material.

Figure 5:
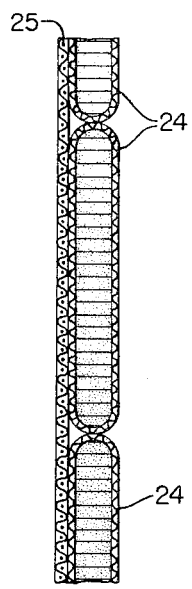
FIG. 5 is a cross-sectional view of another embodiment of the invention.

The inner wall of the pouches 19 need not be continuous as shown in FIG. 4 but may be constructed with each pouch being an individual unit as are the pouches 24 in FIG. 5. Each pouch is then attached to the outer surface of the wall 25. It will be understood that the pouches can be square, rectangular, tubular, or any other shape which is best suited to the structure to which they are to be attached.

Figure 6:
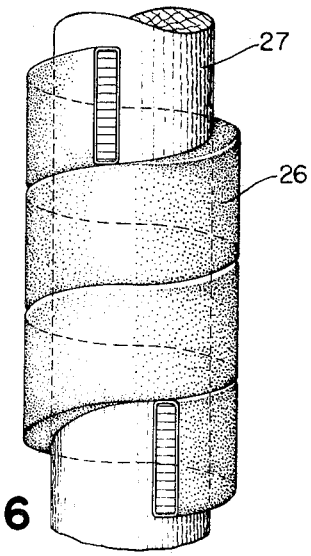
FIG. 6 is a fragmentary side view which shows another embodiment of the invention.

FIG. 6 shows the use of a flat tubular covering member 26 of dual wall construction similar to that shown in FIG. 5, with the tubular member 26 spiraled around a piling 27 to protect it when it is submerged under water. The covering 26 may be fastened to the piling 27 by any suitable waterproof adhesive or other means.

Since this invention is directed primarily toward the reservoir or the container for supplying the toxic or repellent material rather than the material pe se, the chemical aspects of all the materials which may be used will not be described in further detail. It will be understood that although a dual-wall fabric structure has been shown as one way of fabricating a reservoir for containing the toxic material, it should also be noted that other materials may be used to provide the dual-wall reservoir with the primary requisite being that the outer wall is permeable with respect to the toxic material and that the structure provides a means of maintaining a spaced relationship between the inner and outer wall of the covering.

Various changes can be made in the illustrative embodiments shown herein without departing from the scope of the invention.

What is claimed is:

1. An antifouling covering for preventing the growth of marine organisms on the exterior of marine objects submerged in sea water comprising:
   (A) an inner fabric-reinforced wall positioned next to and surrounding the object to be protected,
   (B) an intermediate layer of diffusible material capable of preventing the attachment of marine organisms,
   (C) an outer fabric-reinforced wall which is permeable with respect to the intermediate layer to permit diffusion of the intermediate layer therethrough to provide a continuous supply of the toxic material to the outer surface of the outer wall to replace that which is lost to the sea water, and
   (D) a plurality of interconnecting cord-like members passing through the intermediate layer and connecting together the inner and outer walls in spaced relationship to each other.

2. An antifouling covering as claimed in claim 1 wherein the intermediate layer is a repellant to marine organisms.

3. An antifouling covering as claimed in claim 1 in which the covering is comprised of a plurality of separate pouch-like chambers for containing the toxic layer.

4. An antifouling covering as claimed in claim 1 wherein both the inner and outer walls are permeable with respect to at least one substance in the intermediate layer and wherein the intermediate layer contains preservative substances for preventing deterioration of both the objects being protected and the walls of antifouling covering.

5. An antifouling covering as claimed in claim 1 wherein the covering is comprised of a flat tubular dual wall structure which may be wrapped around the object to be protected.

6. An antifouling covering as claimed in claim 1 wherein the intermediate layer contains toxic material in a paste-like form.

7. An antifouling covering as claimed in claim 6 wherein the toxic material is bis(tri-n butyl tin oxide) and outer wall has a layer of elastomeric material which is permeable to the toxic material.

8. An antifouling covering for preventing the growth of marine organisms on the exterior of marine objects submerged in sea water comprising:
   (A) a double-wall structure having inner and outer coated fabric walls defining a chamber therebetween,
   (B) a plurality of cord-like members connecting the opposed faces of said walls and holding them in spaced relationship to each other.
   (C) a toxic diffusible material filling said chamber,
   (D) said inner wall coated with an impermeable material to prevent passage of the toxic material inwardly against the object to be protected, and
   (E) said outer wall coated with a material permeable to the toxic material to permit the toxic material to gradually diffuse through the outer wall to provide a continuous supply of toxic material to the outer surface of the covering to kill marine organisms coming in contact therewith.

References Cited

UNITED STATES PATENTS

| | | | |
|---|---|---|---|
| 879,649 | 2/1908 | Kennon | 52—517 |
| 2,435,986 | 2/1948 | Taylor | 114—222 XR |
| 2,657,716 | 11/1953 | Ford | 52—2 XR |
| 2,743,510 | 5/1956 | Mauney et al. | 161—49 |
| 2,865,702 | 12/1958 | Bruner | 106—15 XR |
| 2,874,548 | 2/1959 | Drushel et al. | 61—54 |
| 2,930,710 | 3/1960 | Koenecke et al. | 117—75 XR |
| 3,008,213 | 11/1961 | Foster et al. | 161—49 XR |
| 3,033,724 | 5/1962 | Stokes | 161—49 XR |
| 3,276,841 | 10/1966 | Philip et al. | 21—61 XR |
| 3,426,473 | 2/1969 | Cardarelli et al. | 43—131 |

MORRIS O. WOLK, Primary Examiner

S. RICHMAN, Assistant Examiner

U.S. Cl. X.R.

21—2.7, 58, 61; 52—2, 517; 61—54; 114—222; 161—49, 159; 239—57